(12) United States Patent
Bone et al.

(10) Patent No.: US 7,121,008 B2
(45) Date of Patent: Oct. 17, 2006

(54) CLAMPING MECHANISM

(75) Inventors: Danield Bone, Durham (GB); Philip Wren, Durham (GB)

(73) Assignee: Black & Decker Inc., Newark, DE (US)

( * ) Notice: Subject to any disclaimer, the term of this patent is extended or adjusted under 35 U.S.C. 154(b) by 448 days.

(21) Appl. No.: 10/077,718

(22) Filed: Feb. 15, 2002

(65) Prior Publication Data

US 2002/0095800 A1 Jul. 25, 2002

Related U.S. Application Data

(62) Division of application No. 09/015,615, filed on Jan. 29, 1998, now Pat. No. 6,449,851.

(30) Foreign Application Priority Data

Jan. 31, 1997 (GB) ................................. 9701991.3
Jun. 26, 1997 (GB) ................................. 9713378.9

(51) Int. Cl.
*B23D 51/04* (2006.01)
*B26D 7/01* (2006.01)
*B27B 11/10* (2006.01)

(52) U.S. Cl. ............................. 30/372; 30/124; 30/378; 269/237; 269/239

(58) Field of Classification Search .................... 30/92, 30/124, 166.3, 371–378; 70/16; 83/452, 83/456, 462, 463, 743, 745, 759; 269/203, 269/207, 212, 215, 237, 239
See application file for complete search history.

(56) References Cited

U.S. PATENT DOCUMENTS

| 464,100 | A | * | 12/1891 | Kling | ........................... 192/46 |
| 2,175,488 | A | * | 10/1939 | Stoll | ......................... 192/46 X |
| 2,548,443 | A | * | 4/1951 | Nicholson | .................... 297/246 |
| 4,138,867 | A | * | 2/1979 | Tompkins | ....................... 70/16 |

* cited by examiner

*Primary Examiner*—Clark F. Dexter
(74) *Attorney, Agent, or Firm*—Harness, Dickey & Pierce P.L.C.

(57) ABSTRACT

The invention relates to a powered reciprocating saw. To simplify use of the saw, a clamping mechanism is provided which holds an object in position while it is sawn. The clamping mechanism is mounted at the front of the housing of the saw near the saw blade. The clamping mechanism comprises: a slide element for sliding movement in the cutting direction, a supporting member, and a clamping arm rotatably mounted on the slide element by a one way clutch to clamp an object therebetween in a clamping position below the saw blade. When the saw is in use, it vibrates. Since the clamping arm has a moment of inertia with respect to the axis of rotation of the one way clutch, the oscillating movement is transformed into a progressive rotational movement of the clamping arm to clamp an object.

7 Claims, 11 Drawing Sheets

CLAMPING MECHANISM

This is a division of U.S. patent application Ser. No. 09/015,615, filed Jan. 29, 1998 now U.S. Pat. No. 6,449,851.

FIELD OF THE INVENTION

The invention relates to a hand held powered reciprocating saw, and in particular to a mechanism for holding an object while it is cut by the blade of the reciprocating saw.

BACKGROUND OF THE INVENTION

A typical reciprocating saw is disclosed in GB 2 234 033. The reciprocating saw disclosed therein comprises a housing having a handle portion and a front portion from which a saw blade extends. The saw blade is guided for reciprocating movement and is connected to a drive mechanism within the housing which drives the saw blade to reciprocate. A typical example of saws of this kind are pruning saws used for cutting the branches of trees, bushes and the like. In this field of application the user holds the saw at the handle portion and brings the reciprocating saw blade into contact with the branch to be cut. The reciprocating saw blade is slowly moved through the branch while cutting it. The reciprocating movements of the saw blade exert forces on the object which is sawn, i.e. the object, for example a branch, tries to follow the reciprocating movement of the saw blade since there is a considerable friction between the reciprocating saw blade and the branch. Therefore, the user has to grip the branch and hold it tightly with one hand against the saw, while the pruning saw is held in the other hand in order to achieve an accurate cut. The need to hold the object, e.g. a branch, to be sawn with the reciprocating saw can make the saw very inconvenient to use.

Another problem or inconvenience arises due to the fact that the user has to absorb the oscillating forces which act between the reciprocating saw and the object which is sawn. When the user grips the branch to be cut and holds the reciprocating saw with the other hand he has to absorb the reciprocating forces acting between the branch and the saw with his arms. On the one hand this makes use of the saw tiring, and on the other hand, since the user cannot hold the branch completely fixed, the cut can be inaccurate if the saw is not steadily held in the same position with respect to the branch.

The problems outlined above do not apply to pruning saws only but to reciprocating saws in general. Whenever the object to be sawn has a certain flexibility or is not fixed and so has to be held by the user, for example when a rod has to be cut into pieces of shorter length, problems as described above arise.

The problems are further exacerbated when the branches of trees and bushes high above a user are cut using a reciprocating saw mounted on an extension arm or pole. In this case a user cannot reach the branch to be cut to hold it while it is cut. Thus, the reciprocating movement of the blade is transferred to the branch and the branch reciprocates also. This reduces the cutting performance of the saw, can lead to inaccurate cuts being made and tends to increase the length of time required to complete the task in hand.

It is therefore desirable to have a clamping device to hold the object to be saw stationary to prevent it from following the reciprocating movement of the saw blade whilst allowing the saw blade to cut through the object.

One such clamping device for a compass saw is disclosed in GB 2,182,282 and comprises a clamping holder in the form of a part circular bracket which is pivotally mounted at its centre on the body of the saw. On one arm of the part circular bracket is a clamping jaw having two inwardly facing clamping surfaces. On the other arm of the part circular bracket is a clamping part which comprises a threaded shaft which screws through a corresponding threaded hole, the direction of travel of the shaft as it screws into or out of the hole being within the plane of the clamping device either towards or away from the clamping jaw. In operation, the workpiece to be cut is inserted into the region bounded by the part circular bracket and is clamped between the clamping part and the clamping jaw by screwing the clamping part towards the clamping jaw and trapping the workpiece in between. As the blade of the saw cuts through the workpiece, the clamping device pivots to allow the workpiece to remain in contact with the cutting edge of the saw blade.

The clamping device disclosed in GB 2,182,282 must be firmly attached to the object to be sawn by the user prior to commencing the sawing operation. This can be difficult if the object to be sawn is located in an awkward position, for example, if it is a branch high up in a tree. The user is required to use both hands whilst attaching the clamp, one to hold the clamping device against the object to be cut whilst the other tightens the clamping part to hold the object to be cut. Furthermore, as the clamping device is firmly attached to the object to be cut, the only movement relative to the object to be cut which the body of the saw can make whilst cutting through the object to be cut is a pivotal movement. This may be undesirable in certain situations where there is insufficient room for the body of the saw to pivot.

DE 4429408 also disclosed a clamping device for a compass saw. The clamping device comprises a structure similar to a pipe wrench which is pivotally mounted on the saw housing. The object to be sawn is clamped by turning a knob which in turn rotates a threaded spindle to bring two clamping surfaces of the wrench into engagement with and thus hold the object. The clamping device disclosed in DE 4429408 suffers from the same problems as those suffered by the clamping device in GB 2,182,282.

SUMMARY OF THE INVENTION

It is an object of the present invention to overcome the problems outlined above. In particular it is an object to provide a hand held reciprocating saw which allows the user to hold the saw with one hand without the need to hold the object to be cut with the other hand in order to prevent an oscillating movement of that object while it is cut.

According to a first aspect of the present invention there is provided a hand-held powered saw which saw has a reciprocating cutting blade and comprises:
  a clamping arm which is rotatably mounted on the saw by means of a one way rotary clutch such that the arm can freely rotate in one direction only; and
  a support member which co-operates with the clamping arm to hold an object to be cut;
  wherein the centre of mass of the clamping arm is spaced apart from the axis of rotation of said rotary one way clutch so that the vibration of the saw when the saw is in use induces a progressive rotation of the clamping arm.

The vibration of the saw induces a stepwise progressive rotation of the clamping arm due to its moment of inertia. Since the clamping arm can rotate in one direction only, movements caused by the moment of inertia while the saw as a whole is vibrating results in stepwise rotational movements in one direction only. Thus, when the saw is activated and held by the user with the saw blade reciprocating, the clamping arm performs a progressive rotational movement. If the user holds the saw close to a branch so that the branch contacts the support member the rotational movement of the clamping arm has the effect that the clamping arm closes and clamps the branch resting on the support member. If the object to be cut is not properly clamped when it comes into contact with the saw blade, the initial movement of the object as it follows the reciprocating movement of the blade causes greater vibrations which quickly accelerates the clamp into place. Thus, the user only has to position the saw such that the branch can be held between support member and clamping arm, and the clamping mechanism will close automatically driven by the reciprocating movement of the saw. The clamping arm and support member can be arranged so that they co-operate with each other to firmly clamp the object to be cut between the two. However, the clamping arm and support can alternatively be arranged so that they co-operate with each other to hold the object to be cut against the cutting edge of the saw blade. In either arrangement the saw blade can then be moved relative to the object, by a variety of means, in the direction of cut so that the reciprocating saw blade can move through the object held between the support member and clamping arm to cut the object. Objects such as branches can be sawn while holding the reciprocating saw with one hand without having to hold the branch as well.

The forces in the direction of blade reciprocation between the object and the saw which are caused by the reciprocating movement of the saw blade through the object can be absorbed by the holding of the object between the clamping arm and support member. Thus, the reciprocating saw according to the invention is easier and more convenient to use than prior art saws.

As the blade cuts through the object to be cut, the clamping arm may rotate in order to maintain hold with the co-operation of the support member, on the object to be cut and thus ensure that any reciprocating movement of the object to be cut is prevented or substantially reduced whilst the object is being cut.

A preferred means of moving the saw blade relative to an object held between the clamping arm and support member uses a slide element which is slideably mounted on the saw for sliding movement in a direction across the blade wherein the clamping arm is mounted on the slide element so that the sliding movement of the slide element and clamping arm guides an object held between the support member and the clamping arm across the cutting blade. Preferably, the support member is also mounted on the slide element so that the object held between the support member and the clamping arm does not have to move across the support member as it is guided across the cutting blade.

The support member may comprise the reciprocating saw blade. The shape of the clamping arm can be designed so that it grips and holds the object to be cut against the cutting edge of the blade without the assistance of any other part of the saw. The clamping arm would prevent or substantially reduce the reciprocating movement of the object to be cut caused by the reciprocating movement of the saw blade. As the blade cut through the object to be cut, the clamping arm would rotate ensuring that the object to be cut is securely held by the clamping arm to prevent or substantially reduce the reciprocating movement of the object. By using the saw blade as the support, it is possible to design a reciprocating saw with a clamping mechanism so that the object to be cut can be held against any part of the length of the reciprocating blade.

Where the clamping arm co-operates with the support member to hold the object to be cut against the cutting edge of the saw blade, ideally, the shape of curvature of the surface of the clamping arm which engages an object to be cut (hereinafter referred to as the holding surface) and location of the axis of rotation of the clamping arm are such that when an object of circular cross section is first cut by the reciprocating blade, the tangent to the surface of the object at the point on the surface where the clamping arm first makes contact with the object is at an angle of between 30° and 60° and preferably between 40° and 50° to a plane which passes through the length of the blade which plane is 90° to the plane of the blade. This has the benefit of providing a clamping arm which can securely hold objects to be cut against the cutting edge of the blade for a variety of such objects which vary greatly in their cross sectional areas whilst preventing or severely reducing the reciprocal movement of the object caused by the reciprocal movement of the blade.

In a preferred embodiment of the present invention, the clamping arm is mounted on the saw via a reverse slip clutch which allows rotation of the clamping arm in the reverse direction to the direction of free rotation of the rotary one way clutch if a reverse torque is exerted exceeding a specified threshold. This embodiment allows the user to remove the object from the clamping mechanism in a simple manner by manually turning the clamping arm in a direction opposite to the direction of rotation of the rotary one way clutch. Ideally, the one way rotary clutch and the reverse slip clutch are co-axially mounted to simplify the construction.

Furthermore, it is preferable that the axis of rotation of the rotary one way clutch is oriented essentially perpendicular to the plane of the blade.

Ideally, the clamping arm is made from a plastics material having a metal weight located towards the end of the clamping arm distant from the rotary one way clutch. By making the clamping arm from plastic, it makes the manufacture of the clamping arm cheaper and easier. Furthermore, it reduces the weight of the clamping arm which in turn reduces the overall weight of the saw making it easier for the user to use. By adding a metal weight towards the end of the clamping arm away from the one way rotary clutch, the centre of mass of the clamping arm is moved a greater distance from the axis of rotation of the clamping arm. This results in a greater moment of inertia of the clamping arm about the axis of rotation and therefore increases its rate of rotation.

In the plane of the clamping arm, the direction of curvature of the end of the clamping arm distant from the one way rotary clutch should preferably be opposite to that of the holding surface of the clamping arm, for example the clamping arm may be 'S' shaped. Changing the direction of curvature of the tip region of the clamping arm prevents the clamping arm from snagging on larger branches and makes it easier to pull the saw away from a branch whilst it is still being held by the clamping mechanism.

According to the second aspect of the present invention there is provided a clamping mechanism which is mountable on a hand-held powered reciprocating saw which saw has a reciprocating cutting blade, said clamping mechanism comprising:

a clamping arm which is rotatably mounted on the clamping mechanism by means of a one way rotary clutch such that the arm can freely rotate in one direction only;

wherein the centre of mass of the clamping arm is spaced apart from the axis of rotation of said rotary one way clutch.

BRIEF DESCRIPTION OF THE DRAWINGS

In the following the invention will be described in more detail with reference to the accompanying drawings in which.

DETAILED DESCRIPTION OF THE PREFERRED EMBODIMENT

Figure 1:
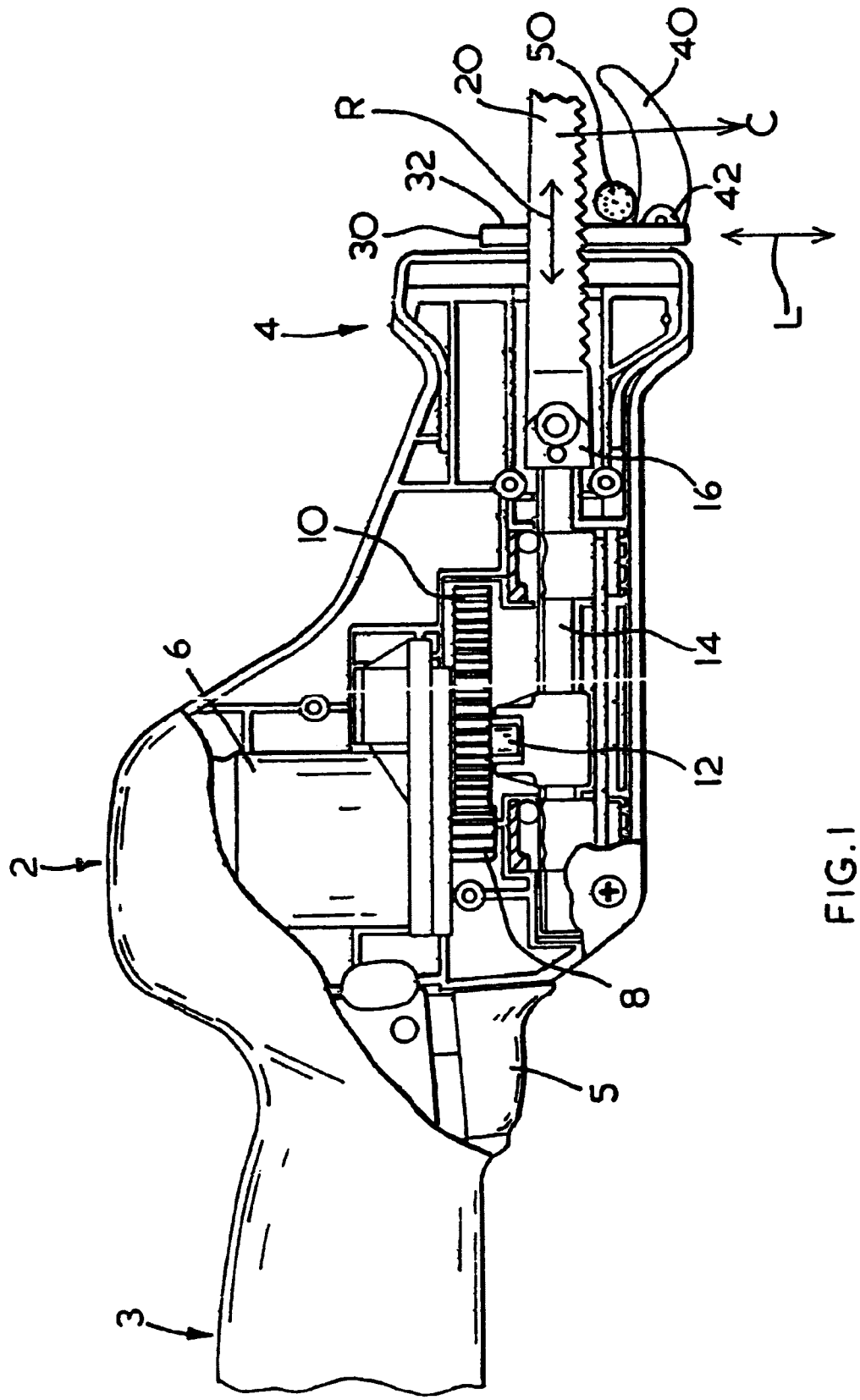
FIG. 1 shows a sectional view of a reciprocating saw having a clamping mechanism according to the first embodiment of the invention.

Referring to FIG. 1 of the drawings, the saw has a housing 2 having a handle portion 3 and front portion 4 from which a reciprocating saw blade 20 projects through a slot in the front portion 4, for reciprocation in the directions shown by the arrow R. An electric motor 6 is mounted within the housing which drives a driving gear 8. A switch 5 is provided to turn the motor on and off. The driving gear 8 is in engagement with gear wheel 10. An eccentric pin 12 is attached to the gear wheel 10. The eccentric pin 12 is in engagement with a transverse groove in which it can slide in a direction transverse to the direction of reciprocating movement of the saw blade 20. The groove is formed in a member which is connected to a reciprocating shaft 14. Rotation of the gear wheel 10 thus drives the reciprocating shaft 14 in a reciprocating movement. At the front end of the reciprocating shaft 14 a blade holder 16 is attached which holds the saw blade 20.

Figure 2:
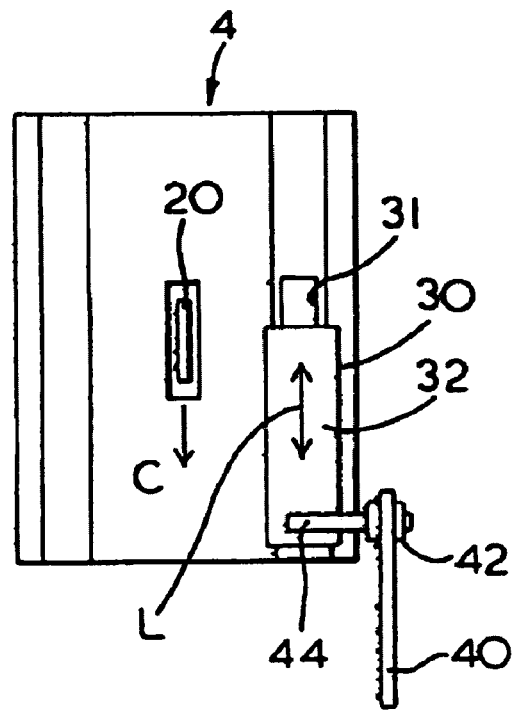
FIG. 2 shows a schematic front view of the reciprocating saw of FIG. 1.

A first embodiment of the clamping mechanism as disclosed in FIGS. 1 to 3 is provided at the front portion of the housing and comprises a sliding element 30 and a clamping arm 40. The clamping arm 40 is mounted on the sliding element 30 via a rotary one way clutch 42 so that the clamping arm can freely rotate in one direction only (in a counter-clockwise sense in the representation of FIG. 1).

The clamping mechanism is shown in a front view in FIG. 2. The clamping mechanism comprises the clamping arm 40 and the slide element 30. The slide element 30 presents a supporting surface portion 32 which faces away from the front portion of the housing and which serves to support an object in a position below the saw blade 20 and while it is cut. A rod 44 is attached to the slide element 30 at a lower end portion thereof. A rotary one way clutch 42 is fitted to the outer end portion of the rod 44. The clamping arm 40 has a bore with an inner diameter so that it can be fitted onto the outer circumference of the one way rotary clutch 42. As will be described in more detail below, it is preferred that the clamping arm 40 is not directly connected to the rotary one way clutch 42 but via a further intermediate clutch.

As can be seen from FIG. 2, the clamping arm 40 is held by the rod 44 in a position so that the plane of rotation of the clamping arm 40 is beyond the envelope of the housing, and the clamping arm 40 can freely rotate around 360° without interfering with parts of the housing. The slide element 30 may be a precision ball slide having an inner guiding part 31 which is attached to a guard member of the front portion of the housing. The slide element or table 30 is slideable with respect to the guide element 31 by two sets of ball rollers (not shown) which are retained in raceways on both sides of the guide element 31 between the guide element 31 and the slide element 30 which can thereby perform a linear sliding movement (in the directions of the arrow L in FIGS. 1 and 2). The direction of linear movement is aligned with the cutting direction (shown by the arrow C in FIGS. 1 and 2) of the saw blade 20.

The rotary one way clutch can be of a type known as drawn cup roller clutch. These clutches are annular rings which can be fitted over a shaft. They have a thin walled drawn outer ring which has a series of ramps on its inside diameter. Needle rollers, which are retained and guided by a plastic cage, form the clamping elements. The needle rollers are held in the locked/unlocked position by springs. The frictional moment during idling of drawn cut roller clutches is very low so that the clutch can very easily be rotated in one direction whereas it can withstand a relatively much higher reverse torque before the clutch is damaged.

Figure 3A:
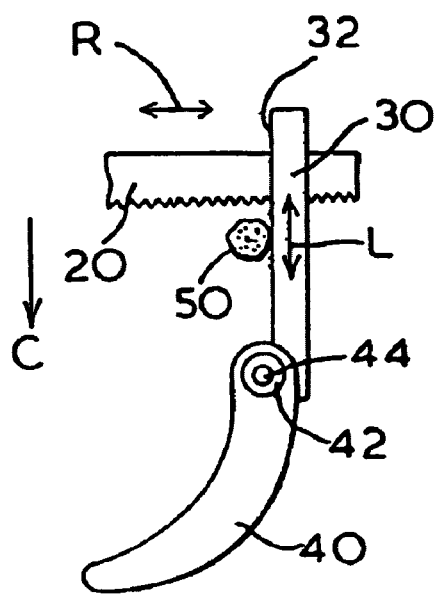
FIGS. 3a, 3b show schematic side views of the clamping mechanism of FIGS. 1 and 2 in two positions.
Figure 3B:
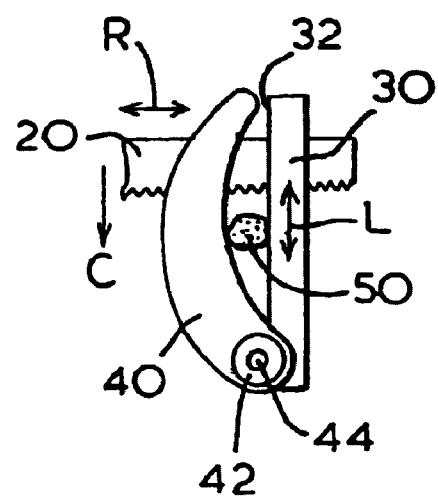

The operation of the clamping mechanism will be described in connection with FIGS. 3a and 3b. In FIGS. 3a and 3b only the slide element 30 and the clamping arm 40 are shown whereas the guide element 31 and the housing of the saw have been omitted. The clamping arm 40 can freely rotate in clockwise direction by means of one way rotary clutch 42 which is attached by rod 44 to the slide element 30.

In operation of the saw, the reciprocating movement of the reciprocating shaft 14 and the saw blade 20 induces vibration of the saw as a whole because of the inertia of the reciprocating parts. This vibration is even stronger when the gripping portion 3 is not aligned with the reciprocating parts so that an oscillating torque is induced when the user holds the saw at its gripping portion 3. The vibration of the saw is also transferred to the slide element 30. Thus, the one way rotary clutch 42 also vibrates. Since the clamping arm 40 has a moment of inertia with respect to this axis of rotation of the one way rotary clutch 42, the vibrations are transformed into a stepwise, progressive rotational movement of the clamping arm 40, the clamping arm 40 making one incremental rotational movement in each back and forth movement of the vibration of the saw. Therefore, when the saw is in operation, the clamping arm 40 progressively turns in its direction of free rotation (clockwise in FIGS. 3a and 3b).

When the saw is held to a object to be sawn, e.g. a branch 50, so that the branch 50 abuts to the supporting surface 32 below the saw blade 20, the rotational movement of the clamping arm 40 induced by the vibration of the saw, automatically closes the clamping mechanism, thereby clamping the branch 50 between clamping arm 40 and supporting surface 32 as shown in FIG. 3b. In this position further rotational movement of the clamping arm 40 is prevented by the branch 50. Then, the user moves the saw as a whole down with respect to the branch 50 in the direction of cut (C) to bring the sawing blade 20 into contact with the branch 50 and to move the reciprocating saw blade through the branch 50. During this movement the sliding element 30 performs its linear sliding movement relative to the cutting blade 20 in a direction opposite to the direction of cut since it is clamped to the branch 50. Thus, the branch is guided across the blade 20 and is accurately cut.

With the clamping mechanism described, the user simply holds the saw as usual with the object to be sawn near the front portion below the reciprocating saw blade. When the drive mechanism of the saw is activated, the vibration of the saw as a whole induces the rotational movement of the clamping arm as described and rapidly closes the clamping mechanism so that the object is clamped between the clamping arm and the supporting surface of the slide element. Thus, the user can saw branches of trees while holding the pruning saw in one hand without the need to grip the branch with the second hand.

Figure 4:
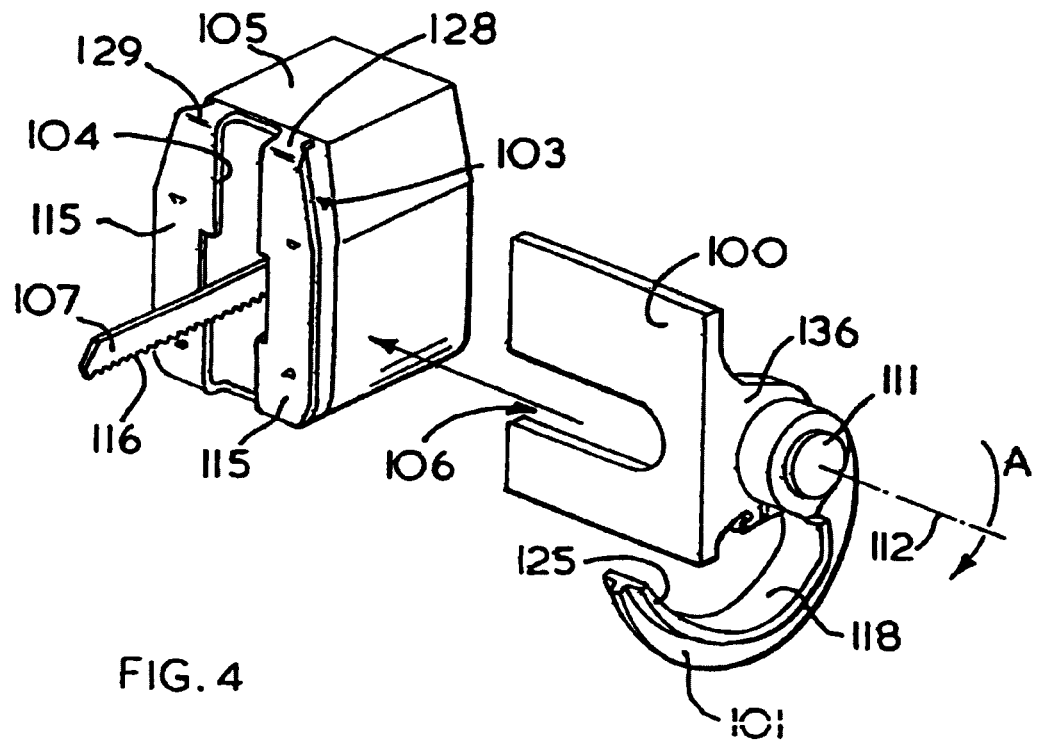
FIG. 4 shows a clamping mechanism according to a second embodiment of the invention which is releasably attachable to a reciprocating saw.
Figure 5:
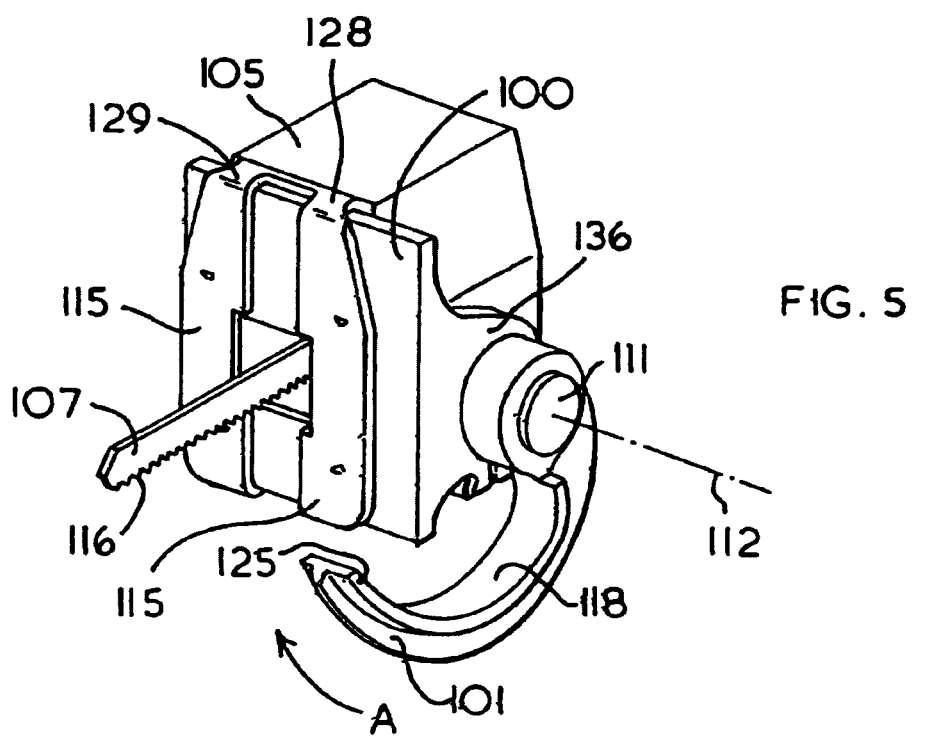
FIG. 5 shows the attachable clamp mechanism of FIG. 4 when it is attached to the front end of a reciprocating saw.
Figure 6A:
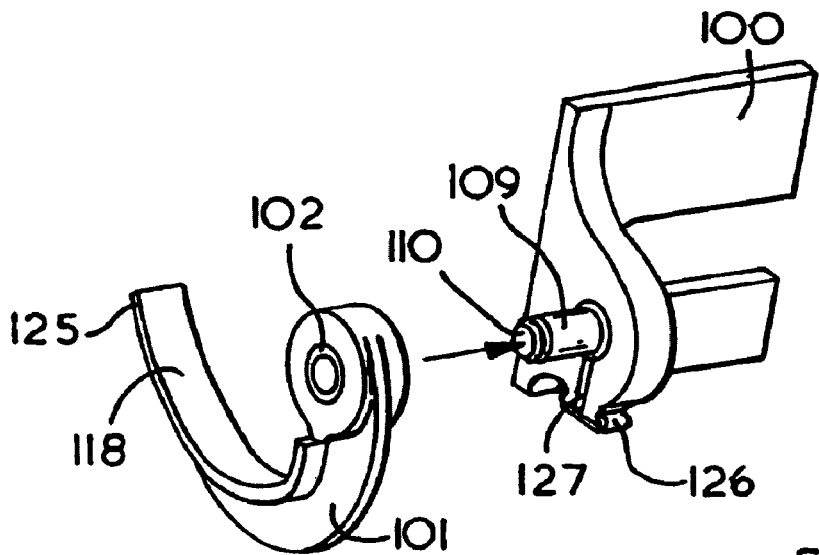
FIG. 6a shows a schematic view of a dismantled clamping mechanism according to the embodiment of the invention shown in FIGS. 4 and 5.
Figure 6B:
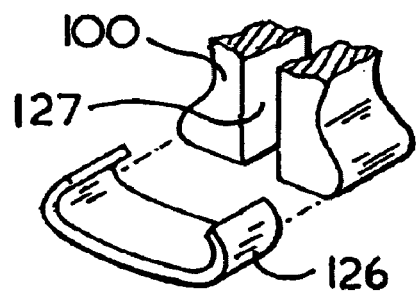
FIG. 6b shows a close up exploded view of the "C" clip and the slot across which it is located as shown in FIG. 6.
Figure 8:
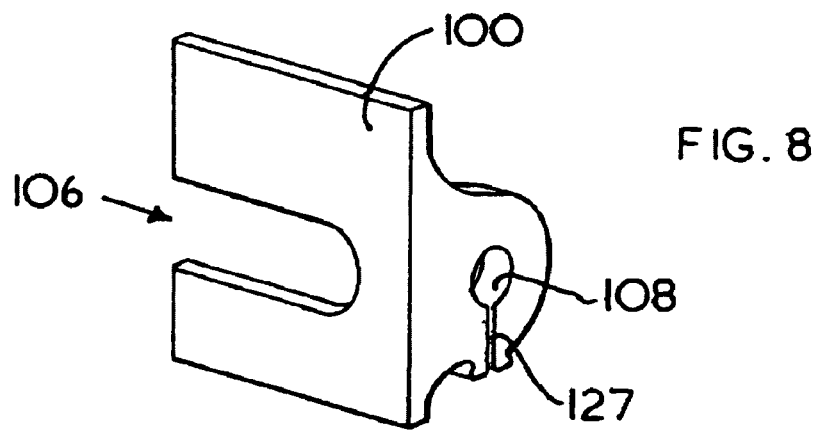
FIG. 8 shows a view of the adapter of the clamping mechanism according to the embodiment shown in FIGS. 4 to 6.

A second embodiment of the clamping mechanism is disclosed in FIGS. 4 to 12. As shown in FIGS. 4 and 5, the clamping mechanism is releasably attachable to the front of a reciprocating saw, 105.

The clamping mechanism comprises an adapter 100 on which is mounted a clamping arm 101 via a one way clutch 102 (see FIG. 6). The adapter 100 is designed so that it is able to slide into two slots 103, 104 on the reciprocating saw 105 formed by two plates 128, 129 which form the front 115 of the reciprocating saw 105 and attach to the saw 105 as shown in FIG. 5.

Figure 7:
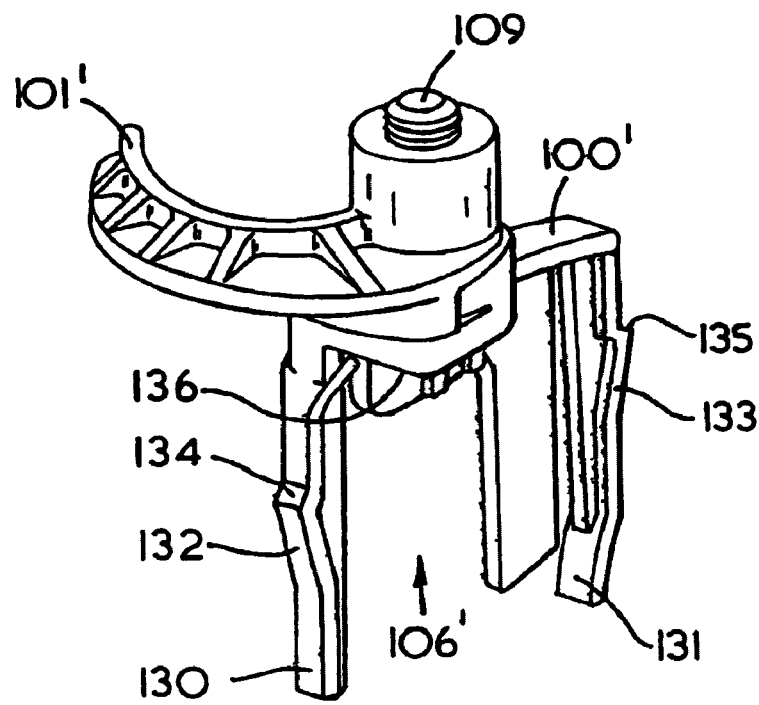
FIG. 7 shows a view of an adapter of the clamping mechanism comprising two resilient arms which clip into the front of a reciprocating saw.

An alternative design of adapter 100' comprising means for attachment to a reciprocating saw 105 is shown in FIG. 7. The adapter 100' comprises two resilient arms 130, 131 which project away from the clamping arm 101' substantially parallel to the axis 112 of rotation of the clamping arm 101'. A ramp 132, 133 is formed on the outer edge of each arm 130, 131. The ramps 132, 133 commence near the end of each arm 130, 131 35 and curve outwardly towards the clamping arm 101'. The ends of the ramps 132, 133 form ledges 134, 135. The distance between the two arms 130, 131 corresponds to the width of the slots 103, 104.

The adapter 100' is attached to the front of the reciprocating saw 105 by sliding the two arms 130, 131 into the two slots 103, 104. As the arms 130, 131 slide into the slots 103, 104 the metal plate 128 which forms the edge of the first slot 103 engages with and slides along the ramps 132, 133, causing the two arms 130, 131 to bend inwardly towards each other. When the ramps 132, 133 on the two arms 130, 131 have passed through the first slot 103 the two arms 130, 131 spring outwards, the ramps 132, 133 entering into the space between the two metal plates 128, 129 to clip the adapter onto the front of reciprocating saw 105. The adapter 100' is prevented from sliding any further by a connecting section 136 of the adapter 101' abutting against the housing of the reciprocating saw 105.

The adapter 101' is prevented from sliding out of the slots 103, 104 by the edge of the metal plate 128 which forms the first slot 103 blocking the path of the ledges 134, 135. In order for the adapter 101' to be removed or unclipped from the slots 103, 104, the two arms 130, 131 must be bent inwardly towards each other in order to move the ledges 134, 135 to positions where the edge of the metal plate 128 would not block their paths when the adapter 101' is withdrawn from the slots 103, 104.

Figure 9:
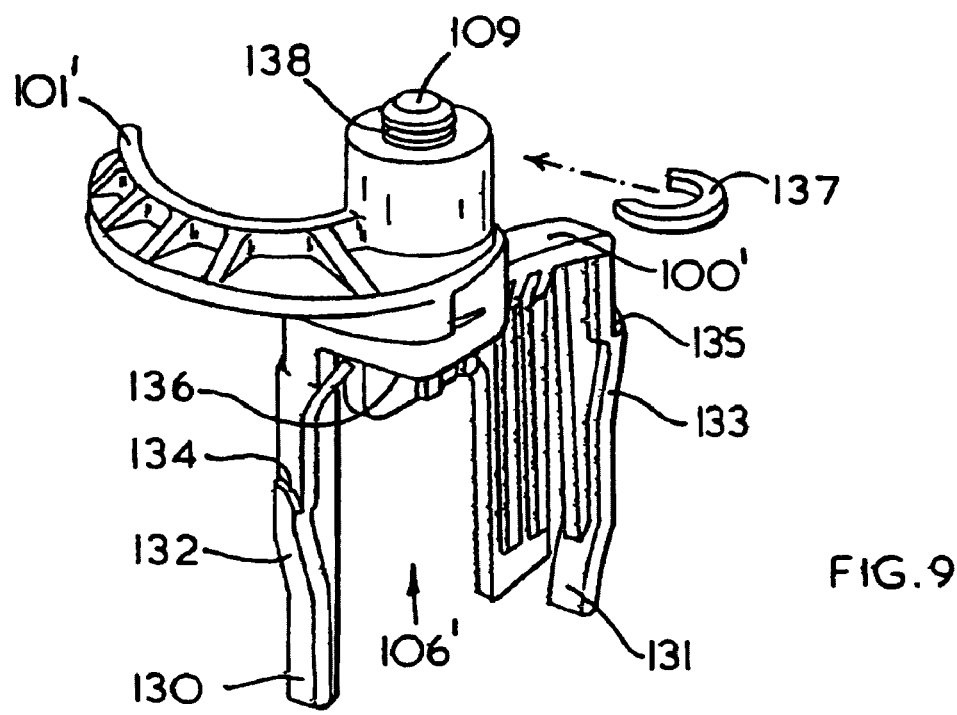
FIG. 9 shows a view of the clamping mechanism with a circular clip holding the clamping arm on the adapter.

A slot 106, 106' has been formed in the adapter 100, 100' so that when the clamping mechanism is attached to the reciprocating saw 105, the blade 107 of the saw 105 is able to freely pass through the slot 106. At the side of the adapter 100, 100' is a hole 108 (see FIG. 8) through which a spindle 109 passes. The clamping arm 101 is attached to the spindle 109 via the one way clutch 102. The two embodiments shown in FIGS. 4–9 are similar and will be described in terms of one of the embodiments. The clamping arm 101 is mounted onto the one way clutch 102 and the one way clutch 102 is press fitted onto the spindle 109 so that the clamping arm 101 is not able to rotate relative to the spindle 109 in the direction opposite to the direction of free rotation of the one way clutch 102. A part circular clip 137, as shown in FIG. 9, fits into a corresponding groove 138 formed around the circumference of the end of the spindle 109 to hold the clamping arm 101 and the one way clutch 102 on the spindle 109. The end 110 of the spindle 109 is covered by a cap 111. As an alternative to the part circular clip 137, two resilient protrusions (not shown) integrally formed with the clamping arm 101 can project into the groove 138 to hold the clamping arm 101 and the one way clutch 102 on to the spindle 109. The spindle 109 is able to rotate within the hole 108 when sufficient rotational torque is applied to the spindle 109. The spindle 109 is unable to slide axially within the hole 108. The spindle 109 and the hole 108 together form a secondary reverse slip clutch which shall be described in greater detail further below.

The clamping arm 101 is only able to rotate in one direction (shown by arrow A in FIG. 4) in relation to the adapter 100 due to the one way clutch 102.

Figure 10:
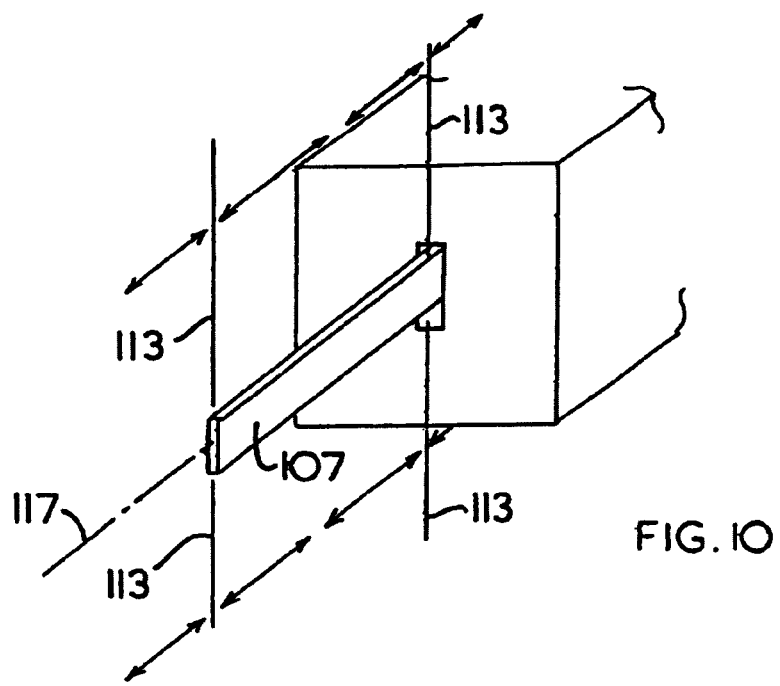
FIG. 10 shows the plane of the blade of a reciprocating saw.

When the clamping mechanism is attached to the reciprocating saw 105, the clamping arm 101 is held by the adapter 100 so that it is beyond the envelope of the housing of the saw 105 so that the clamping arm 101 can freely rotate around 360° without interfering with parts of the housing. The axis of rotation 112 of the clamping arm 101 is perpendicular to the plane 113 of the blade 107. The plane 113 of the blade is shown in FIG. 10.

The rotary one way clutch 102 is a drawn cup roller clutch of the type previously described.

The operation of the clamping mechanism will now be described in relation to FIGS. 11 and 12. The two figures shown are schematic diagrams. For simplicity, the figures only show the saw blade 107, a branch 114 and a representation of the front housing 115 of the saw 105.

In operation, the clamping mechanism is attached to a reciprocating saw. When the saw is activated, the saw 105 as a whole vibrates because of the inertia of the reciprocating parts. The vibration of the saw 105 is transferred to the adapter 100. Thus, the adapter 100 together with the one way rotary clutch 102 also vibrates. The vibrational movement of the adapter 100 is transferred to the clamping arm via the one way rotary clutch 102. Since the clamping arm 101 has a moment of inertia about the axis rotation 112 of the one way rotary clutch 102, the vibrations are transformed into a stepwise, progressive rotational movement of the clamping arm 101, the clamping arm 101 making one incremental rotational movement in each back and forth movement of the vibration of the saw 105. Therefore, when the saw 105, is in operation, the clamping arm 101 progressively turns in its direction of free rotation (shown by arrow A).

The saw 105 is placed near the branch 114 to be cut so that it lies near to the cutting edge 116 of the blade 107. When the saw 105 is operated, the arm 101 rotates until it holds the branch 114 against the front 115 of the housing and the cutting edge 116 of the blade 105. The clamping arm 101 is then hindered from any further rotation by the branch 114.

Figure 11:
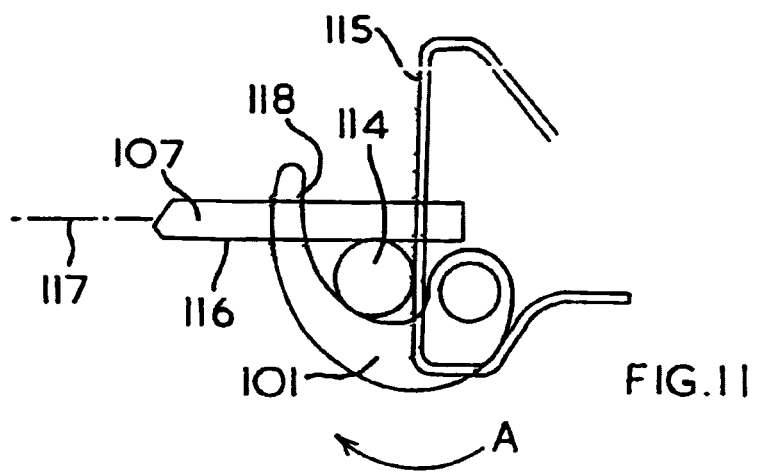
FIG. 11 shows a schematic view of the second embodiment of the invention in which the clamping mechanism is holding a branch.
Figure 12:
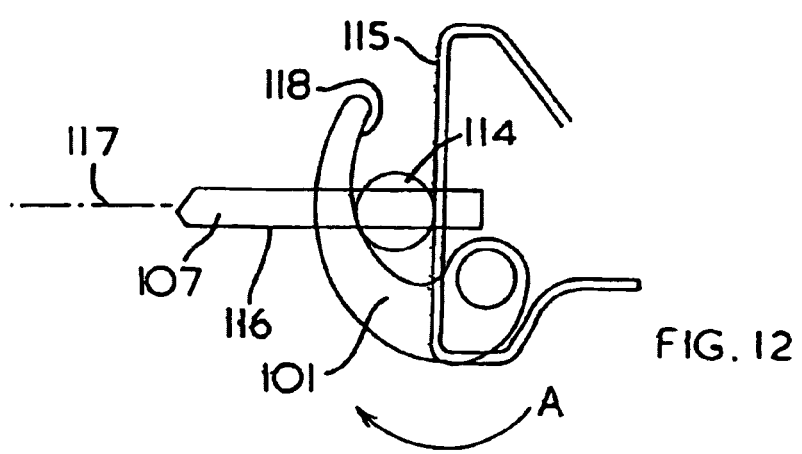
FIG. 12 shows a schematic view of the second embodiment of the clamping mechanism holding a branch which has been partially cut through by the blade of the saw.

FIG. 11 shows the branch 114 being held against the cutting edge 116 of the saw blade 107, by the clamping arm 101 and the front 115 of the saw housing. The clamping arm 101 is only able to rotate in the direction indicated by arrow A and therefore the branch 114 is prevented from reciprocation along the axis 117 with the reciprocating blade 107 by the clamping arm 101 and the front 115 of the saw housing.

As the reciprocating blade 107 is moved through the branch 114, it cuts the branch 114 which moves upwardly relative to the blade 107 as shown in FIG. 10. As the branch 114 moves upwards, the clamping arm 101 rotates due to vibration of the saw 105 ensuring that the branch 114 remains held fast by the clamping arm 101 and the front 115 of the housing against the cutting edge 116 of the blade 107 and so is prevented from reciprocating along the direction of the axis 117 with the blade 107.

Figure 13:
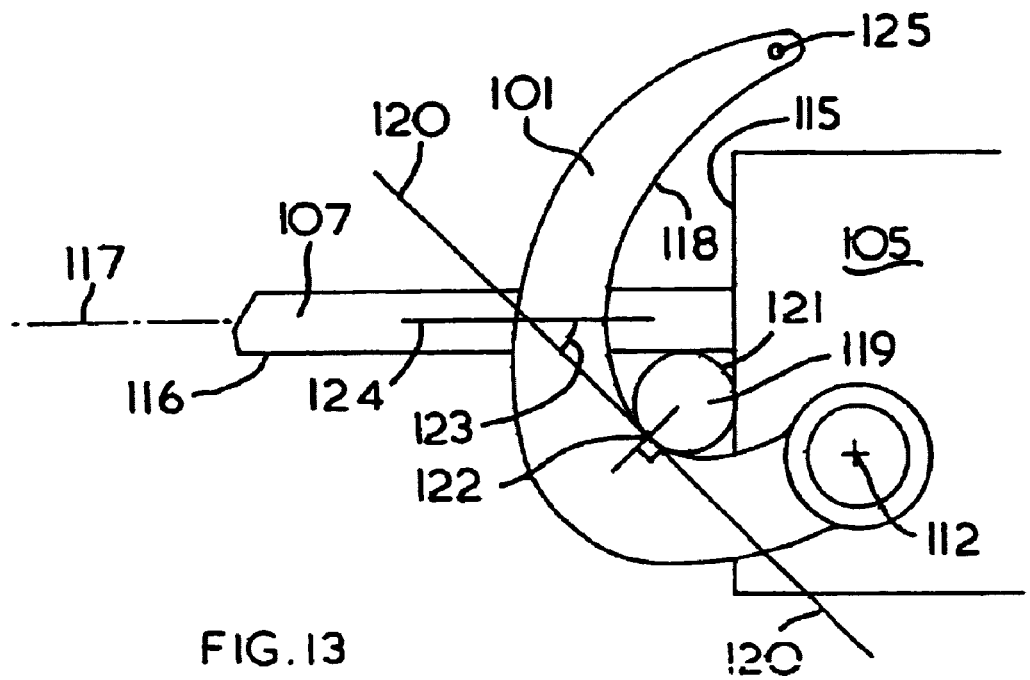
FIG. 13 shows the geometry of the shape of the clamping arm, in a first position.
Figure 14:
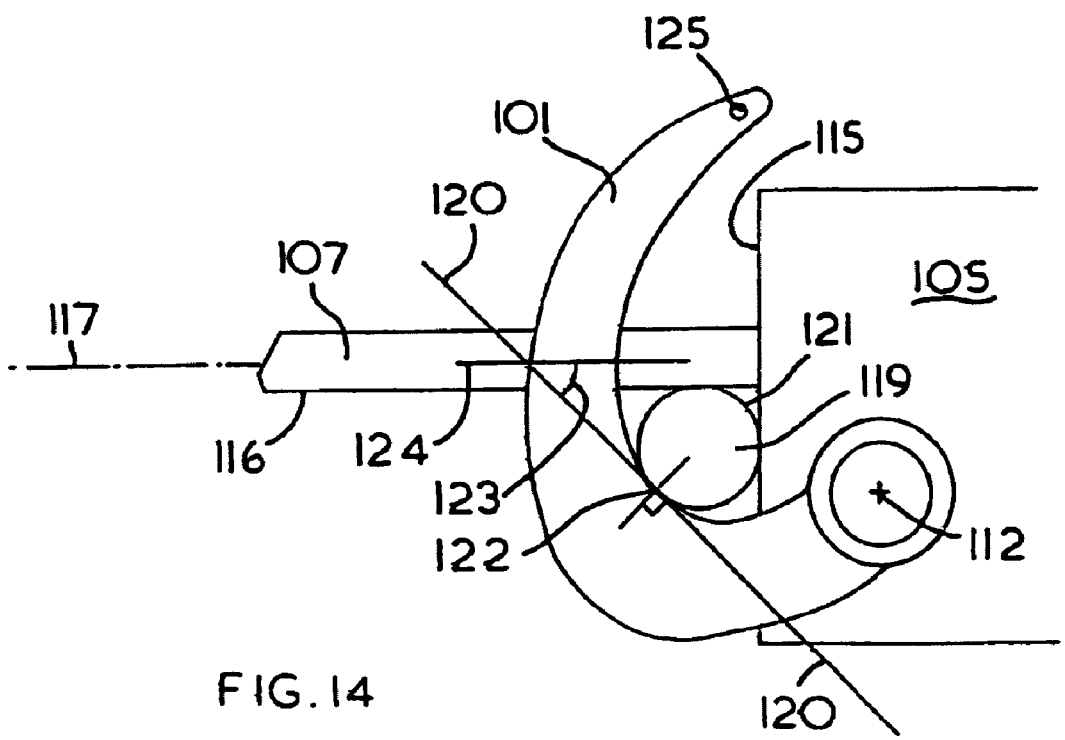
FIG. 14 shows the geometry of the shape of the clamping arm in a second position.
Figure 15:
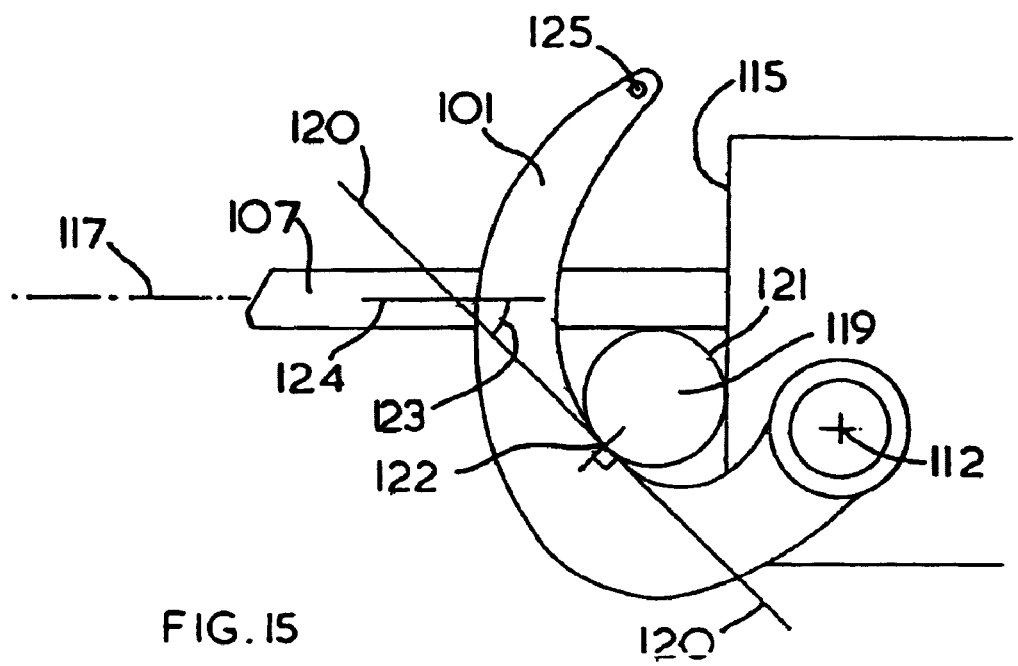
FIG. 15 shows the geometry of the shape of the clamping arm in a third position.
Figure 16:
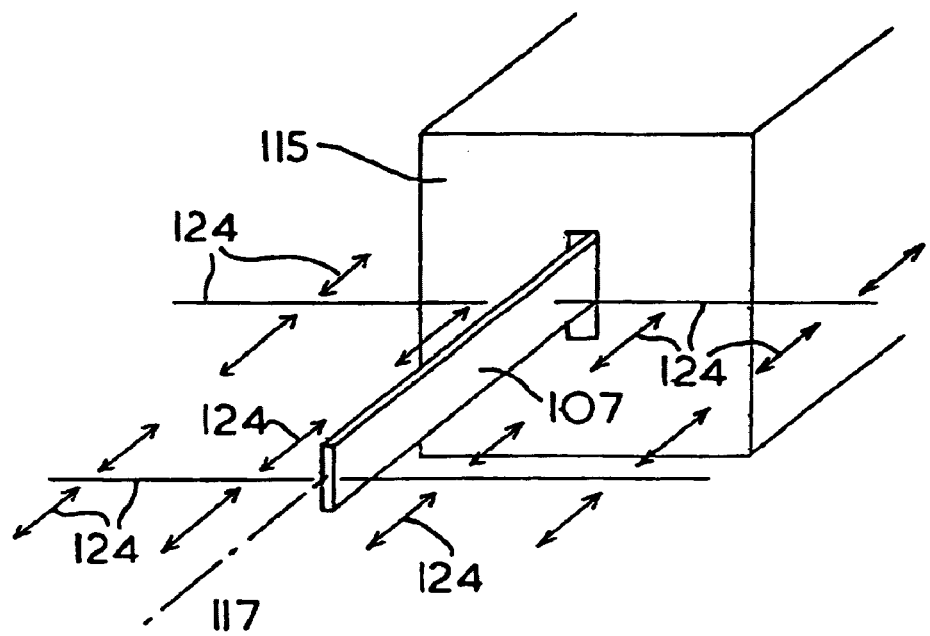
FIG. 16 shows a plane which passes through the length of the blade.

Referring now to FIGS. 13 to 15, the curvature of the holding surface 118 of the clamping arm 101 and the location of the axis 112 of rotation of the clamping arm 101 are such that when a pole 119 of circular cross section is first cut by the reciprocating blade 107, the tangent 120 to the surface 121 of the pole 119 at the point 122 on the surface 121 where the clamping arm 101 first makes contact with the pole 119 is at an angle 123 of 45° to a plane 124 (as shown in FIG. 16) which passes through the length of the blade 107. A pole 119 is used as it represents a branch 114 with an ideal shaped cross-section i.e. circular. The plane 124 which passes through the length of the blade 107 is shown in FIG. 16 and is at 90° to the plane 113 of the blade 107. When a large diameter pole is cut, a different part of the holding surface 118 of the clamping arm 101 makes contact with the pole 119 when it is initially cut by the cutting edge 116 of the blade 107. However, due to the shape of the holding surface 118 of the arm, the tangent 120 of the circumference 121 at the point 122 where the clamping arm 101 first makes contact with the pole 119 is always 45° to the plane 124 through the length of the blade 107. The pole shown in FIG. 11 has a smaller diameter than that shown in FIG. 14 which in turn is smaller than that in FIG. 15.

The clamping arm 101 shown in FIGS. 13 to 15 is made from plastic. A metal pin 125 is inserted into the tip of the clamping arm. The rate of rotation of the arm is dependent upon the moment of inertia induced into the clamping arm 101 which is in turn dependent upon the distance between the centre of mass of the clamping arm 101 and the axis 112 of rotation of the clamping arm 101. By adding a relatively heavy metal pin 125 to the tip of the clamping arm 101, the distance between the axis 112 of rotation of the clamping arm 101 and the centre of mass is increased and hence the rate of rotation of the clamping arm 101 is increased.

In the previously described embodiments after the object has been sawn the user can pull the object out of its clamped position between the supporting surface 32;115 and the clamping arm 40;101, whereupon the clamping arm 40;101 starts its rotational movement again if the reciprocating movement of the saw blade continues. Then, the user can position the saw near the next branch to be cut, and the foregoing procedure is repeated.

Figure 17:
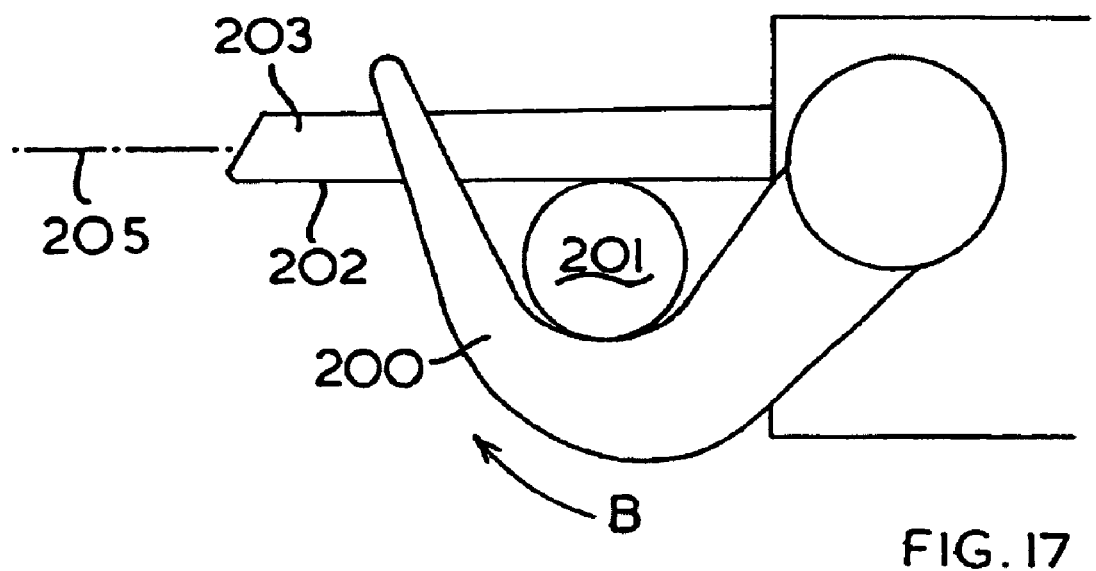
FIG. 17 shows a clamp mechanism according to the third embodiment of the present invention.

A third embodiment of the clamping arm mechanism is disclosed in FIG. 17. The method of construction and operation of the third embodiment is similar to that of the first and second embodiments except that the clamping arm 200 is shaped so that the branch 201 is held against the cutting edge 202 of the saw blade 203 by only the clamping arm 200.

The clamping arm 200 is mounted on a one way rotary clutch and is therefore only able to rotate in the direction shown by arrow B. The shape of the clamping arm 200 is such that, when it holds the branch 201 against the cutting edge 202 of the saw blade 203, the arm prevents the branch from reciprocating along the direction of the axis 205 with the blade 203. As the blade 203 cuts through the branch 201, the branch 201 moves upwards relative to the blade 203 allowing the clamping arm 200 to rotate due to the vibrations of the saw and to continue to hold the branch 201 against the cutting edge 202 of the blade 203.

In any of the embodiments described above, in order to simplify removal of the object being held either by the clamping arm 200, or between the clamping arm 40;101 and the supporting surface portion 32;115, a reversing mechanism can be provided which allows rotation of the clamping arm 40;101;200 in the opposite direction to the direction of free rotation of the one way rotary clutch 42;102. Such a mechanism is provided by a reverse slip clutch acting between the clamping arm 40;101;200 and the fixed part 44;100;203. The reverse slip clutch can be provided between the rod 44 or spindle 109 and the rotary one way clutch 42;102 or between the outer circumference of the rotary one way clutch 42;102 and the bore of the clamping arm 40;101;200. In its simplest form the reverse slip clutch can be provided by using a predetermined press fit of the bore of the clamping arm 40 on the outer circumference of the rotary one way clutch 42 as shown in FIGS. 1 to 3. If a certain torque is exerted on the clamping arm 40 the frictional forces between the bore of the clamping arm 40 and the outer surface of the rotary one way clutch are overcome, and the clamping arm may be turned backwards.

An alternative form of reversing mechanism is disclosed in the second embodiment (see FIGS. 4 to 9). The hole 108 in the adapter 100 into which the spindle 109 is inserted has a slot 127 cut from the hole 108 to the edge of the adapter (see FIGS. 6a, 6b and 7). The spindle 109 is located within the hole 108. The diameter of the hole (108) is slightly greater than the diameter of the spindle 109. A 'C' clip 126 is then placed across the end of the slot 127. See FIG. 6b which shows an exploded view of the "C" clip and the slot. The 'C' clip 126 exerts a pressure across the slot 127 causing it to close. This reduces the diameter of the hole 108 and thus the edge of the hole squeezes the spindle 109. This generates a frictional force between the spindle 109 and the edge of the hole 108. The spindle 109 is therefore only able to rotate when a sufficient rotational torque is applied to the spindle 109 to overcome the frictional force between the spindle 109 and the edge of the hole 108. The amount of frictional force between the spindle 109 and the edge of the hole 108 is dependent on the strength of the 'C' clip 126.

Figure 18:
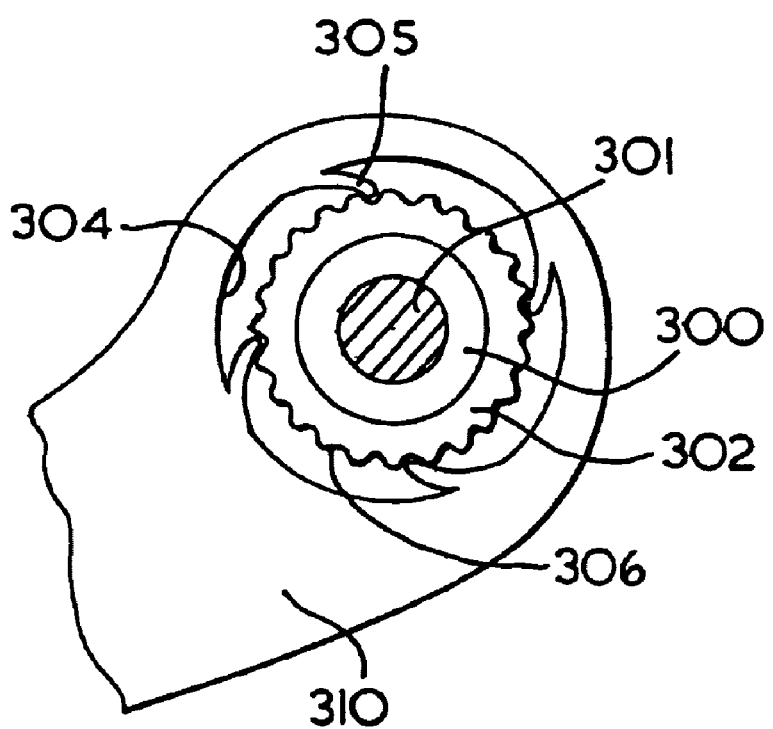
FIG. 18 shows a sectional, fragmentary view of a portion of a clamping arm mounted via a reverse slip clutch to the rotary one way clutch.

However, from a manufacturing point of view, it creates difficulties to provide these reversing mechanisms which hold a reverse torque of a specified value in a reproducible manner. Therefore, a reverse slip clutch mechanism can be utilised, as shown in a simplified and schematical manner in FIG. 18. In FIG. 18, the rotary clutch 300 is fitted onto the rod 301. The rod 301, is rigidly attached to a saw or adapter. On the cylindrical outer surface of the rotary one way clutch 300, a part 302 can be fixed made for example of glass filled nylon or by diecasting or sintering, having a corrugated outer surface. The inner diameter of the bore of the clamping arm 303 is larger than the largest outer diameter of the reverse slip clutch part 302. From the inner surface 304 of the bore of the clamping arm 303 flexible protrusions 305 extend which interact with the corrugations 306 of the reverse slip clutch part 302. The protrusions extend non-radially into the bore and are flexible so that the clamping arm 303 may slip in one direction when a torque is applied above a predetermined torque in threshold value (in counter clockwise direction in FIG. 18) by bending the protrusions 305 so that they can move across the corrugations 306, whereas rotation in the other direction would require a much higher torque. By specifying the dimensions and flexibility of the protrusions 305 the characteristics of the reverse slip clutch, in particular the torque threshold value, beyond which a slipping rotation of the clutch is possible can be adjusted to the desired values. The threshold torque value of the reverse slip clutch should exceed the maximum torque values which could be exerted on the clamping arm by the object while it is sawn.

Figure 19:
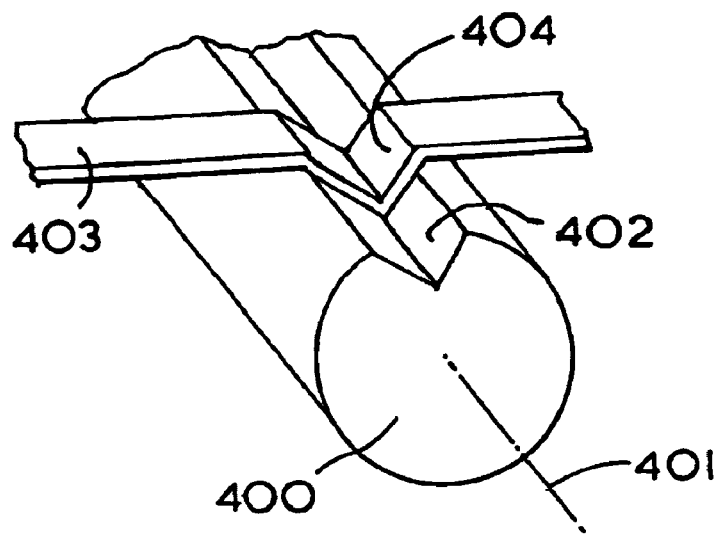
FIG. 19 shows a perspective view of an alternative reverse slip clutch.
Figure 20A:
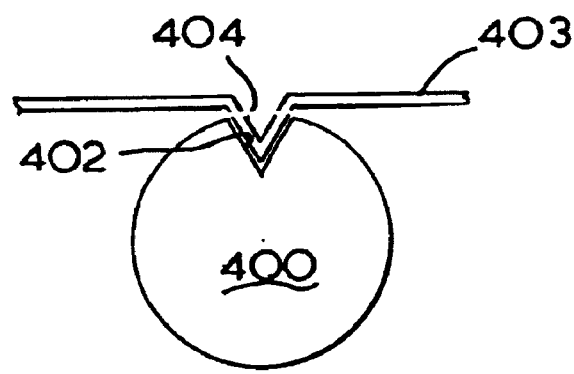
FIGS. 20a and 20b show an end view of the alternative reverse slip clutch in two positions.
Figure 20B:
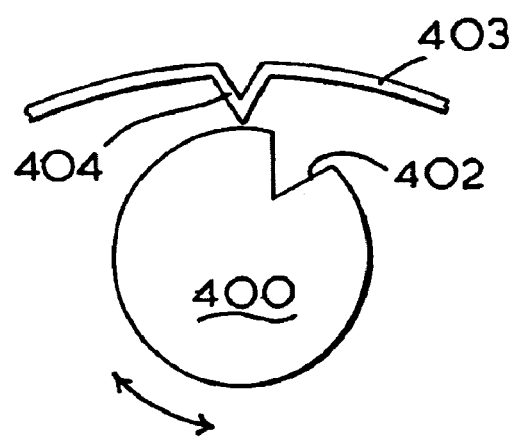

An alternative design for a reverse slip clutch is disclosed in FIGS. 19 and 20a and 20b.

The reverse slip clutch comprises a shaft 400 which is rotatable about its longitudinal axis 401. The shaft 400 is connected to a clamping arm via a rotary one way clutch. A groove 402 runs along part of the length of the shaft 400. A flat leaf spring 403 is located in and is attached at its ends to the adapter 100. The flat leaf spring 403 is bent to form a tooth 404. The tooth 404 is arranged so that it projects into the groove 402 when the shaft 400 is rotated so that the groove 402 faces the tooth 404. When the tooth 404 is located within the groove 402 and a low rotational torque is applied to the shaft 400 the tooth 404 restrains the movement of the groove 402 and thus prevents the shaft 400 from rotating (see FIG. 20a). However, when a rotational torque greater than a predetermined level is applied to the shaft 400 the tooth 404 is forced out of the groove 402 flexing the spring 403 and allowing the shaft 400 to rotate (see FIG. 20b), The predetermined level of rotational torque is determined by the stiffness of the spring 403.

Figure 21:
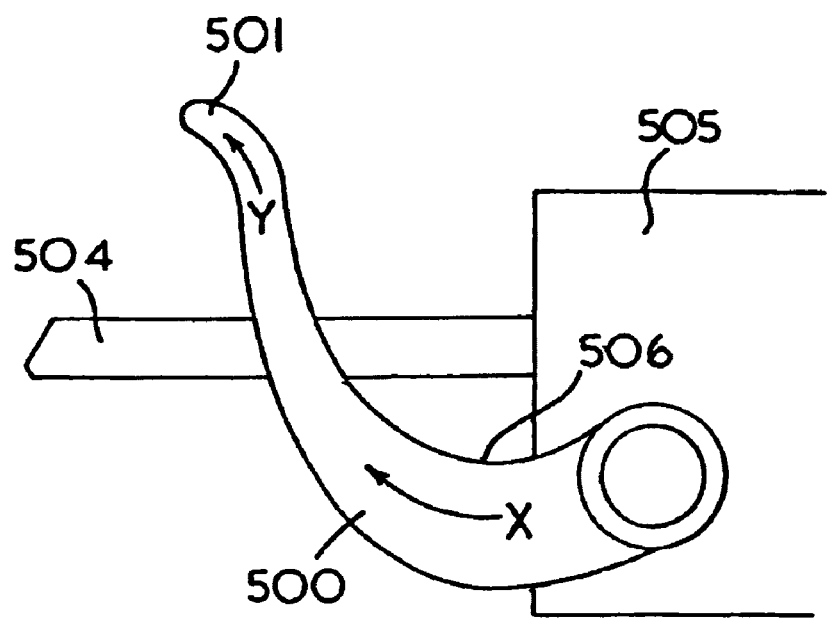
FIG. 21 shows a clamping arm with the tip region having a reverse direction of curvature to that of the holding part of the arm.
Figure 22:
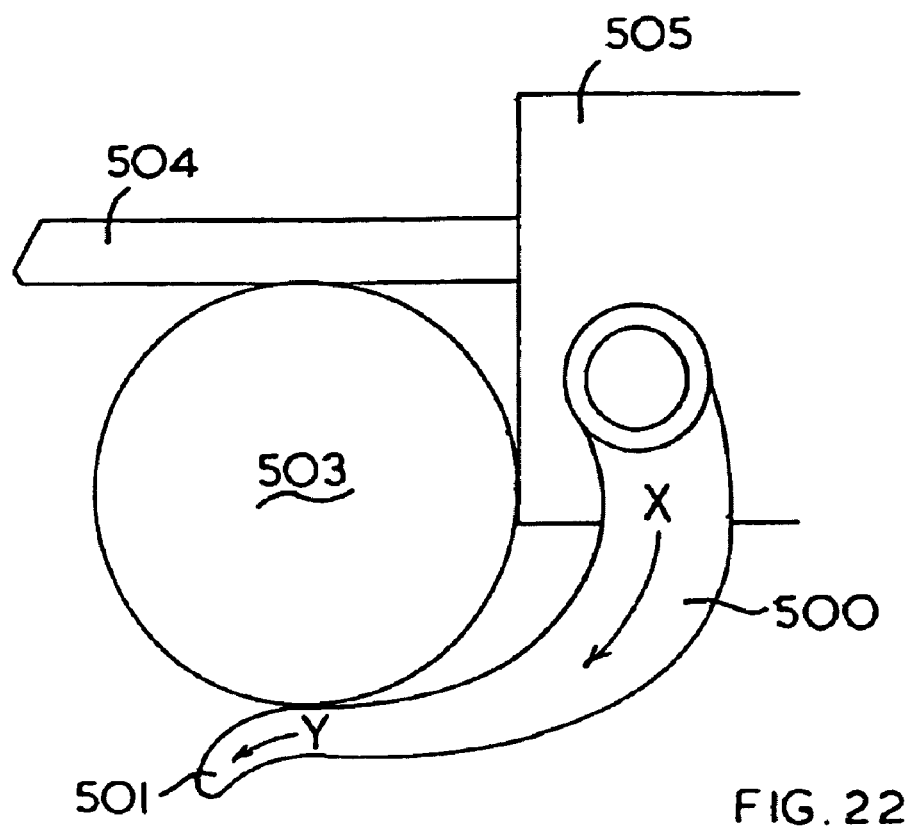
FIG. 22 shows a clamping arm holding a large branch having a tip region with a reverse direction of curvature to that of the holding part of the arm.

In addition to the reversing mechanism, the tip region 501 of the clamping arm 500 can have a curvature in the plane of the clamping arm which is in a reverse direction to that of the holding surface 506 of the clamping arm, as shown in FIG. 21. This enables branches to be removed from the clamping arm 500 more easily. The direction of curvature (Y) of the tip region 501 of the clamping arm 500 is opposite to the direction of curvature (X) of the holding surface 506. This prevents the clamping arm 500 from being snagged on larger branches 503 being cut by the reciprocating blade 504 of the saw 505 as shown in FIG. 22.

The invention claimed is:

1. A clamping mechanism for clamping an object, said clamping mechanism comprising:
 a tool housing;
 a rod attached to said tool housing;
 a clamping arm rotatably mounted on the rod, said clamping arm being rotatable through 360° about an axis of rotation, a supporting surface on each of said clamping arm and said tool housing for engaging said object;
 a non-releasable one way rotary clutch positioned between and operatively engaging said rod and said clamping arm to permit the clamping arm to freely rotate in only one direction about the axis of rotation; and
 the clamping arm having a centre mass spaced apart from the axis of rotation.

2. A clamping mechanism according to claim 1 wherein the clamping mechanism further comprises a support member attached to said tool housing, said support member including said supporting surface of said housing.

3. A clamping mechanism according to claim 2 wherein the support member comprises a slide element, the slide element being slidably mounted on the tool housing, wherein the clamping arm is rotatably mounted on the slide element so that the sliding movement of the slide element and clamping arm guides the object held between the slide element and the clamping arm.

4. A clamping mechanism according to claim 1 wherein the clamping arm is adapted to be mountable on a saw via a reversing slip clutch which allows the clamping arm to rotate in the reverse direction to the direction of free rotation of the rotary one way clutch if a reverse torque is exerted on the clamping arm which exceeds a specified threshold.

5. A clamping mechanism according to claim 4 wherein the one way rotary clutch and the reverse slip clutch are co-axially mounted.

6. A clamping mechanism according to claim 1 wherein the clamping arm is made from a plastic material having a metal weight located towards an end of the clamping arm distant from the one way rotary clutch.

7. A clamping mechanism according to claim 1, wherein the clamping arm has a holding surface and an end distant from the one way rotary clutch, the distant end having a curvature lying in a plane, so that the curvature direction of the clamping arm end is opposite to the curvature direction of the holding surface.

* * * * *

UNITED STATES PATENT AND TRADEMARK OFFICE
CERTIFICATE OF CORRECTION

| | | |
|---|---|---|
| PATENT NO. | : 7,121,008 B2 | Page 1 of 1 |
| APPLICATION NO. | : 10/077718 | |
| DATED | : October 17, 2006 | |
| INVENTOR(S) | : Daniel Bone et al. | |

It is certified that error appears in the above-identified patent and that said Letters Patent is hereby corrected as shown below:

<u>Title Page</u>,
Item [45] Date of Patent, "Oct. 17, 2006" should be -- *Oct.17, 2006 --.
Item [75] Inventors, "Danield" should be -- Daniel --.
Item (*) Notice, insert the following -- This patent is subject to a terminal disclaimer. --.

Signed and Sealed this

Third Day of July, 2007

JON W. DUDAS
*Director of the United States Patent and Trademark Office*